(12) United States Patent
Anderson et al.

(10) Patent No.: US 7,492,953 B2
(45) Date of Patent: Feb. 17, 2009

(54) EFFICIENT METHOD AND SYSTEM FOR REDUCING UPDATE REQUIREMENTS FOR A COMPRESSED BINARY IMAGE

(75) Inventors: Alison H. J. Anderson, Guildford (GB); Ian P. Anderson, Guildford (GB)

(73) Assignee: Smith Micro Software, Inc., Aliso Viejo, CA (US)

( * ) Notice: Subject to any disclaimer, the term of this patent is extended or adjusted under 35 U.S.C. 154(b) by 468 days.

(21) Appl. No.: 10/930,199

(22) Filed: Aug. 31, 2004

(65) Prior Publication Data

US 2005/0281469 A1    Dec. 22, 2005

Related U.S. Application Data

(60) Provisional application No. 60/581,090, filed on Jun. 17, 2004.

(51) Int. Cl.
*G06K 9/36* (2006.01)
(52) U.S. Cl. .................................................. 382/235
(58) Field of Classification Search ................ 382/235, 382/305; 707/1, 10, 101, 201–204; 709/203, 709/213, 217, 227, 246; 710/1, 20, 100; 711/100, 161, 162; 717/168–170
See application file for complete search history.

(56) References Cited

U.S. PATENT DOCUMENTS

| | | | | |
|---|---|---|---|---|
| 5,432,922 A * | 7/1995 | Polyzois et al. | ................ | 714/6 |
| 5,832,520 A * | 11/1998 | Miller | ......................... | 707/203 |
| 5,845,313 A * | 12/1998 | Estakhri et al. | ............. | 711/103 |
| 5,943,675 A * | 8/1999 | Keith et al. | .................. | 707/201 |
| 6,356,961 B1 * | 3/2002 | Oprescu-Surcobe | ......... | 710/20 |
| 6,425,125 B1 * | 7/2002 | Fries et al. | .................. | 717/168 |
| 6,542,906 B2 * | 4/2003 | Korn | .......................... | 707/203 |
| 6,636,876 B1 * | 10/2003 | Ishihara et al. | .............. | 707/202 |
| 6,671,757 B1 * | 12/2003 | Multer et al. | ............... | 710/100 |
| 6,775,423 B2 * | 8/2004 | Kulkarni et al. | ............. | 382/305 |
| 6,925,467 B2 * | 8/2005 | Gu et al. | ..................... | 707/101 |
| 7,210,010 B2 * | 4/2007 | Ogle | .......................... | 711/162 |

* cited by examiner

*Primary Examiner*—Jose L Couso
(74) *Attorney, Agent, or Firm*—Smyrski Law Group, A P.C.

(57) ABSTRACT

A system and method for lossless data compression of byte oriented digital data, including but not exclusively executable program code and related data. This lossless data compression system and method when used to process sets of similar but not identical input data, will generate compressed forms of that data which also have a high degree of similarity. The present invention utilizes an update package generated based on the differences between the compressed forms of data, whereby the update package can be applied to the original compressed form to create the new form. A typical change to create the new form from the original would be when making bug fixes to deployed software.

25 Claims, 10 Drawing Sheets

FIG. 3

Figure 1:
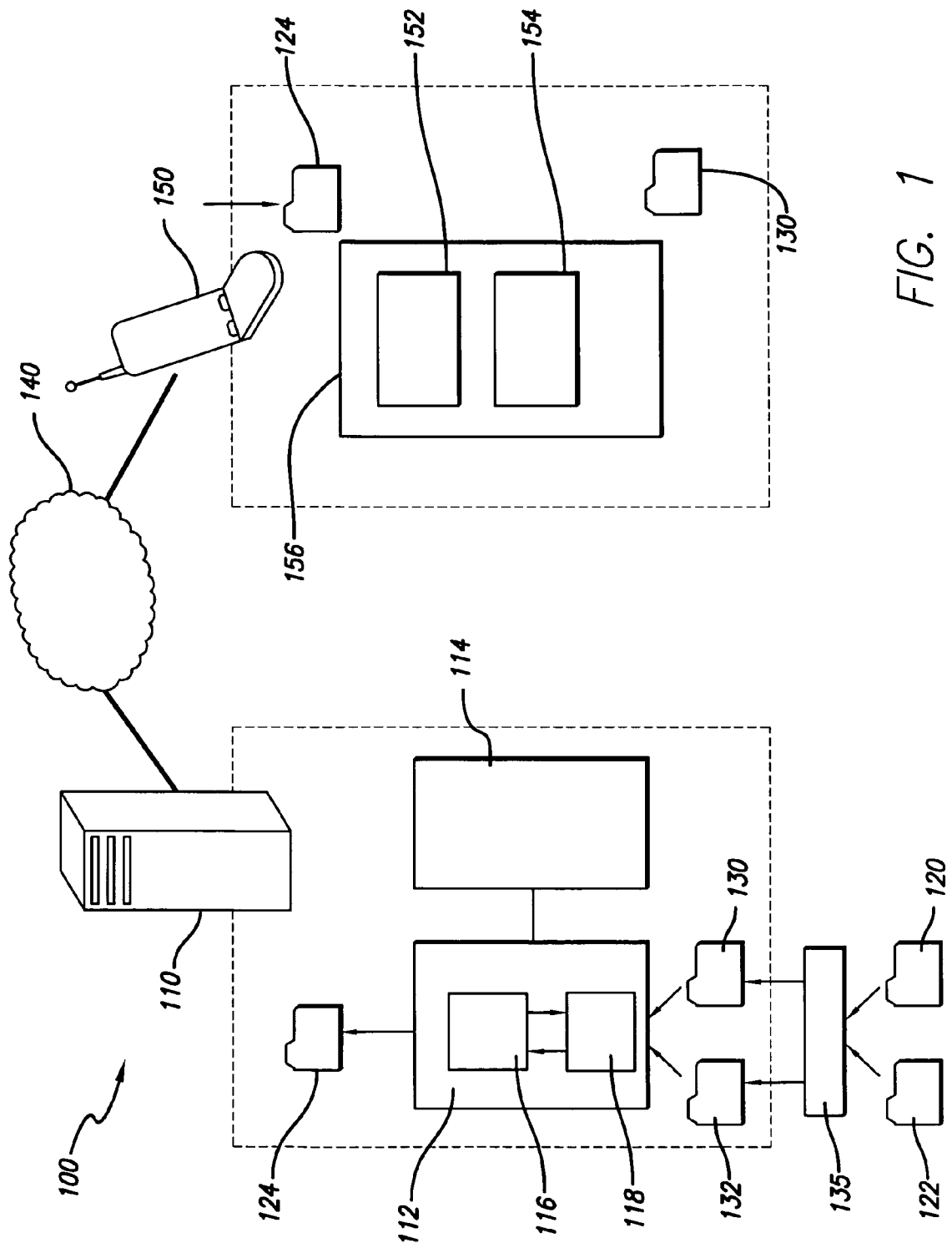

| START ADDRESS | BYTE SEQUENCE | | | | | | | | | SCORE |
|---|---|---|---|---|---|---|---|---|---|---|
| 1325 | 00 | 00 | 00 | 01 | 00 | 23 | 55 | 17 | | 9 |
| 347 | 00 | 00 | 00 | 01 | 00 | 23 | 55 | 17 | 45 67 32 | −(3x2)=3 |
| 10456 | 00 | 00 | 00 | 01 | 00 | 78 | 49 | 27 | 00 | 8 |
| 12387 | 00 | 00 | 00 | 01 | 00 | 78 | 49 | 27 | 43 | +7 |
| 36 | 00 | 00 | 00 | 01 | 00 | 78 | 49 | 35 | 27 00 | −(3x3)=6 |

FIG. 4

| START ADDRESS | BYTE SEQUENCE | | | | | | | | | LENGTH |
|---|---|---|---|---|---|---|---|---|---|---|
| 1325 | 00 | 00 | 00 | 00 | 00 | 23 | 55 | 17 | | 9 |
| 347 | 00 | 00 | 00 | 00 | 00 | 23 | 55 | 17 | 45 67 32 | 12 |
| 10456 | 00 | 00 | 00 | 00 | 00 | 78 | 49 | 27 | 00 | 9 |
| 12387 | 00 | 00 | 00 | 00 | 00 | 78 | 49 | 27 | 43 | 9 |
| 36 | 00 | 00 | 00 | 00 | 00 | 78 | 49 | 35 | 27 00 | 10 |

FIG. 5

Table 500:

| START ADDRESS | BYTE SEQUENCE | LENGTH | SETS | RANK WITHIN SET |
|---|---|---|---|---|
| 1325 | 00 00 00 00 01 00 23 55 17 | 9 | A | 2 |
| 347 | 00 00 00 00 01 00 23 55 17 45 67 32 | 12 | A | 1 |
| 10456 | 00 00 00 01 00 78 49 27 00 | 9 | | |
| 12387 | 00 00 00 01 00 78 49 27 43 | 9 | | |
| 36 | 00 00 00 01 00 78 49 35 27 00 | 10 | | |

515 points to "17" in row 1 byte sequence.
505: SETS column. 510: RANK WITHIN SET column.

FIG. 6

Table 600:

| START ADDRESS | BYTE SEQUENCE | LENGTH | SETS | RANK WITHIN SET |
|---|---|---|---|---|
| ~~1325~~ | ~~00 00 00 00 01 00 23 55 17~~ | ~~9~~ | ~~A~~ | ~~2~~ |
| 347 | 00 00 00 00 01 00 23 55 17 45 67 32 | 12 | A | 1 |
| 10456 | 00 00 00 01 00 78 49 27 00 | 9 | B | 1 |
| 12387 | 00 00 00 01 00 78 49 27 43 | 9 | B | 2 |
| 36 | 00 00 00 01 00 78 49 35 27 00 | 10 | | |

605 points to "00" in row 1. 615 points to "55" in row 1. 610: SETS column.

FIG. 7

700

| START ADDRESS | BYTE SEQUENCE | LENGTH | SETS | RANK WITHIN SET |
|---|---|---|---|---|
| ~~125~~ | ~~00 00 00 00 01 00 23 55 17~~ | ~~9~~ | ~~A~~ | ~~2~~ |
| 347 | 00 00 00 00 01 00 23 55 17 45 67 32 | 12 | A | 1 |
| 10456 | 00 00 00 01 00 78 49 27 00 | 9 | B+C | 1+2 |
| ~~12387~~ | ~~00 00 00 01 00 78 49 27 43~~ | ~~9~~ | ~~B~~ | ~~2~~ |
| 36 | 00 00 00 01 00 78 49 35 27 00 | 10 | C | 1 |

705 — points to "45 67 32"
710 — points to the three "00 00 00 ... 01 00" prefixes

FIG. 8

800

| START ADDRESS | BYTE SEQUENCE | LENGTH | SETS | RANK WITHIN SET |
|---|---|---|---|---|
| ~~125~~ | ~~00 00 00 00 01 00 23 55 17~~ | ~~9~~ | ~~A~~ | ~~2~~ |
| 347 | 00 00 00 00 01 00 23 55 17 45 67 32 | 12 | A+D | 1+2 |
| ~~10456~~ | ~~00 00 00 01 00 78 49 27 00~~ | ~~9~~ | ~~B+C~~ | ~~1+2~~ |
| ~~12387~~ | ~~00 00 00 01 00 78 49 27 43~~ | ~~9~~ | ~~B~~ | ~~2~~ |
| 36 | 00 00 00 01 00 78 49 35 27 00 | 10 | C+D | 1+1 |

805, 810

1100

| COUNT OF DATA TO BE COPIED (C) | COUNT OF NEW DATA TO BE COPIED (N) | ADDRESS POINTERS (A) | COMPRESSED DATA BYTES (B) |
|---|---|---|---|
| 0 | 10 | 36 | 00 00 00 01 00 78 49 35 27 00 |
| 7 | 2 | 10456 | 27 00 |
| 8 | 1 | 12387 | 43 |
| 3 | 9 | 347 | 00 01 00 23 55 17 45 67 32 |
| 9 | 0 | 1325 | |

FIG. 11

1200

| C | N | A | HEX INSTRUCTION BYTE(S) | HEX POINTER BYTES |
|---|---|---|---|---|
| 0 | 10 | 36 | 8A 00 | 00 24 (36) |
| 7 | 2 | 10456 | 27 | 28 B4 (10456−36) |
| 8 | 1 | 12387 | 18 | 07 8B (12387−10456) |
| 3 | 9 | 347 | 89 03 | 80 01 5B (ABSOLUTE 347) |
| 9 | 0 | 1325 | 09 | 03 D2 (1325−347) |

FIG. 12

FIG. 13

| C | N | A | COMPRESSED DATA BYTES B |
|---|---|---|---|
| 0 | 10 | 36 | 03 00 01 00 78 49 35 27 00 |
| 7 | 2 | 10456 | 27 00 |
| 8 | 1 | 12387 | 43 |
| 3 | 9 | 347 | 00 01 00 23 55 17 45 67 32 |
| 9 | 0 | 1325 | |

1300, 1305

FIG. 14

| C | N | A | HEX INSTRUCTION BYTE(S) | HEX POINTER BYTES |
|---|---|---|---|---|
| 0 | 10 | 36 | 8A 00 00 | 00 24 (36) |
| 7 | 2 | 10456 | 27 | 28 B4 (10456−36) |
| 8 | 1 | 12387 | 18 | 07 8B (12387−10456) |
| 3 | 9 | 347 | 89 03 | 80 01 5B (ABSOLUTE 347) |
| 9 | 0 | 1325 | 09 | 03 D2 (1325−347) |

1400, 1405

FIG. 15

1500

| START ADDRESS | BYTE SEQUENCE | | | | | | | | | | | | LENGTH |
|---|---|---|---|---|---|---|---|---|---|---|---|---|---|
| 1325 | 00 | 00 | 00 | 01 | 00 | 23 | 55 | 17 | | | | | 9 |
| 347 | 00 | 00 | 00 | 00 | 01 | 00 | 23 | 55 | 17 | 45 | 67 | 32 | 12 |
| 10456 | 00 | 00 | 00 | 01 | 01 | 00 | 78 | 49 | 27 | 00 | 21 | 00 34 56 | 13 |
| 12387 | 00 | 00 | 00 | 01 | 00 | 78 | 49 | 27 | 43 | | | | 9 |
| 36 | 00 | 00 | 00 | 01 | 00 | 78 | 49 | 35 | 27 | 00 | | | 10 |

1505

FIG. 16

1600

| START ADDRESS | BYTE SEQUENCE | | | | | | | | | | | | LENGTH | FINAL RANK |
|---|---|---|---|---|---|---|---|---|---|---|---|---|---|---|
| 36 | 00 | 00 | 00 | 01 | 00 | 78 | 49 | 35 | 27 | 00 | | | 10 | 1 |
| 10456 | 00 | 00 | 00 | 01 | 01 | 00 | 78 | 49 | 27 | 00 | 21 | 00 34 56 | 13 | 2 |
| 12387 | 00 | 00 | 00 | 01 | 00 | 78 | 49 | 27 | 43 | | | | 9 | 3 |
| 347 | 00 | 00 | 00 | 00 | 01 | 00 | 23 | 55 | 17 | 45 | 67 | 32 | 12 | 4 |
| 1325 | 00 | 00 | 00 | 01 | 00 | 23 | 55 | 17 | | | | | 9 | 5 |

1605

EFFICIENT METHOD AND SYSTEM FOR REDUCING UPDATE REQUIREMENTS FOR A COMPRESSED BINARY IMAGE

CROSS-REFERENCES TO RELATED APPLICATIONS

This application claims priority from U.S. provisional applications Ser. No. 60/581,090 filed Jun. 17, 2004, the disclosure of which are incorporated herein by reference.

FIELD OF THE INVENTION

The present invention relates generally to the field of computer systems, and more specifically to systems and methods for performing lossless data compression of byte orientated digital data, including but not exclusively executable program code and related data. In particular, but not exclusively, the present invention pertains to performing lossless data compression which when used to process sets of similar but not identical input data, will generate compressed forms of that data which also have a high degree of similarity.

BACKGROUND OF THE INVENTION

Recent years have seen the rapid advancement and proliferation of electronic devices, which devices often require the updating of the resident firmware, operating code, applications or other software loaded thereon, collectively, "binary images", or simply "images". Moreover, installing and updating of such binary images is becoming more routine as advancements applicable to a particular device far outpace the rate at which it is desirable to retire the unit and replace it with an entirely new unit. Instead, the operating software and other applications are updated on the device to create a new binary image needing updating or installation on such device.

Moreover, for many devices for which updating the binary image is desirable, these same devices may be remotely located and it is not practical for many reasons to return or collect the device in order that it can be directly connected to a host updating machine or system.

Additionally, with limited memory on the device itself, whether it is a mobile phone, PDA, pager or any other variety of small form factor portable device, delivery of an entire new image is often infeasible due to the capacity limitations of the device.

Manufactures are now deploying portable communication devices employing flash memory. Additionally, manufactures are using compression techniques, such as Lempel-Ziv-Welch (LZW) and similar techniques, to store programs and data within the device. Compression is used in order to reduce the size and therefore cost of the storage media.

In principle data compression applies a reversible transformation to a particular revision of the data. However, today's compression techniques are problematic because when the new image is only slightly different from original image the compression algorithm will often result in the compressed new image being very substantially different from the original image, and in the degenerate case, every byte changes. This is particularly the case with compression based on LZW or similar techniques, and arises because a change in the symbol table generated during the encoding causes cascading further changes to the symbol table, and within a short distance of a changed byte in the new image relative to original image, the encoded symbol stream in compressed new image will be completely unrelated to the corresponding position in the compressed original image.

Accordingly there is a need for an efficient, effective and reliable system and method for data compression of binary data, which preserves similarity in the compressed forms of the compressed original image and the compressed new image when the new image and the original image are similar. For example, applying a small software bug fix or patch is one case where the original image and the new image differ only slightly. Thus, when the compressed image forms are processed by a binary differencing method the resultant delta or update package will be small.

A known manner in reducing the size of a new image update is to use a differencing algorithm or binary differencing engine (BDE) to compare the current or existing binary image with the new binary image to produce a list of differences. Such differences, in a general sense, are typically output or expressed as sequences or sets of ADD and COPY operations such that the new image can be created by re-combining binary strings copied from image sequences resident on the device in the original image and interspersing them with binary sequences from the new image for which a suitable copy string was not available in the old image. Additionally, and Update Encoder communicating with the BDE combines additional encoding information to the select instructions from the BDE and incorporates other operations derived from additional information to ultimately create the update package. One efficient approach to generating update packages is described in U.S. patent application Ser. No. 10/676,483 entitled "Efficient System and Method for Updating a Memory Device", filed Sep. 30, 2003, the disclosure of which is incorporated herein by reference.

The need therefore is for a system that reduces the size impact of systematic changes on the final update package, and optimizes the size and number of operations to find the most effective and minimized update package size for any given compressed original image and compressed new image; resulting in update package sizes which reflect the size of the change made to the compressed image at the raw binary level.

SUMMARY OF THE INVENTION

The present invention has as an object to be able to add new functionality or resolve problems found after deployment of a device, such as a mobile phone, without being recalled by a manufacturer for modification at a service centre. The ability for the device to reliably apply the update itself and allowing the update package to be provided via over-the-air delivery, thus removing the costs associated with a major recall, is a further object of the invention.

A typical embodiment of this invention would be for updating of the flash memory image in a mobile phone where the update package has been delivered to the phone over-the-air and is being applied to the flash memory without the subscriber returning the phone to a service centre for update. Thus, a further and more specific object of the invention is to affect lossless data compression that preserves the similarity in the compressed forms of the original first and new second images when there is similarity in their uncompressed forms.

Thus it is a further object of the invention to combine this compression technique with techniques developed to create minimal sized update packages, often know as "delta", "difference", or "diff" packages, such that an update package may be applied by a program in the client device to the resident original compressed image to create the new second compressed image.

A typical embodiment of this invention would be for any application using binary differencing techniques to store multiple images for microprocessors instructions and data by use of a compressed original image and update packages will benefit from the achieved reduced storage requirements.

The present invention is a binary compression technique that executes on both the original and new images prior to the delta or differencing processing. This binary compression operation has three principle components:

1. Finding "cutting points" within the uncompressed image;
2. Sorting the sections created by dividing the image at the cutting points and encoding these with the elimination of repeated data; and
3. Using an address pointer associated with each section to reconstruct the compressed new image from the compressed original image and a small update package (i.e. delta).

The present invention has as an object to update a compressed binary image held in non-volatile memory on a device such as a mobile phone by application of an update package to upgrade the image in-situ, rather than have to supply a complete copy of the new image. With the update package delivered to the device, the device itself can update the stored compressed image. Accordingly, yet a further object of the invention is a space efficient storage of an update package expressing the difference between a compressed original image and a compressed updated version of that image. These small update packages may feasibly be transmitted over low speed communications links (e.g. a GSM network), and stored on devices with limited available memory (e.g. a mobile phone).

As will be evident through further understanding of the invention, any application using binary differencing techniques to store multiple images by use of a compressed original and update packages (rather than simply the raw images themselves) would potentially benefit from reduced storage requirements. This method of generating update packages could be applied to any device using conventional block-structured non-volatile memory such as flash memory; i.e., those with limited additional memory for storage of new images prior to update would benefit by requiring only the space for the much smaller update package to be held instead.

BRIEF DESCRIPTIONS OF THE DRAWINGS

Figure 2:
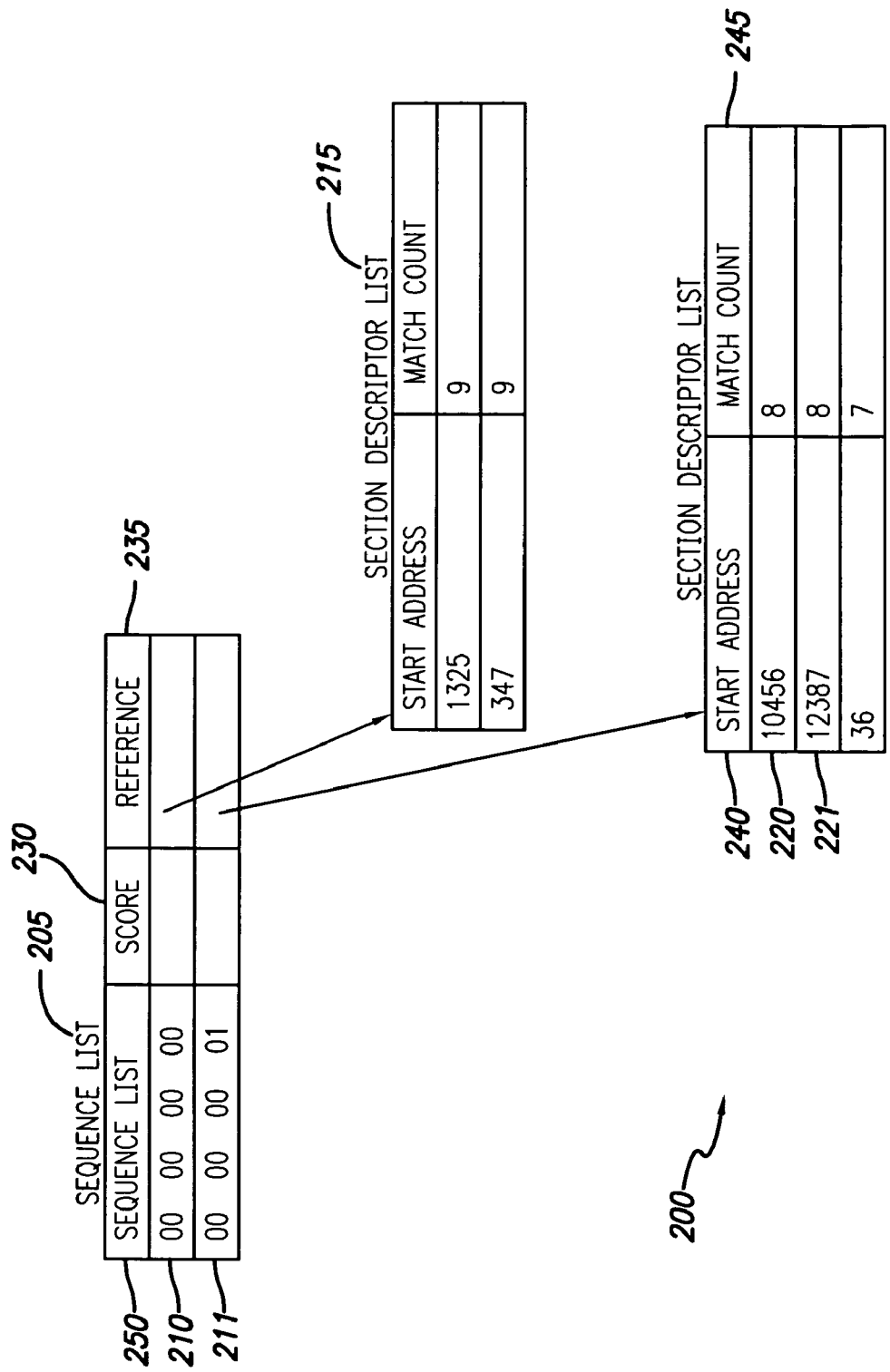
Figure 9:
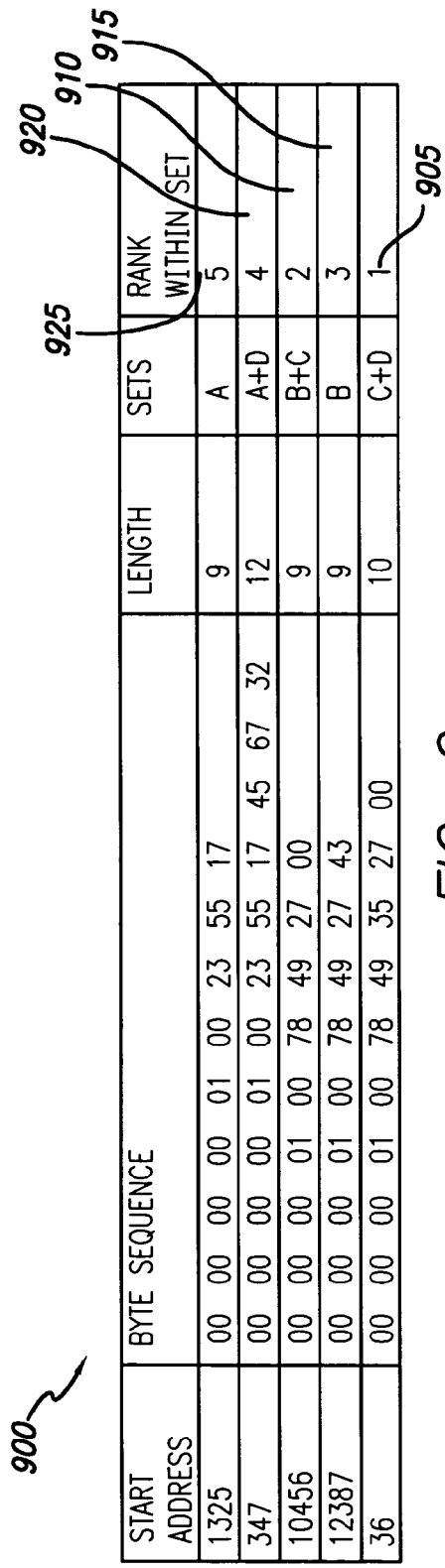
Figure 10:
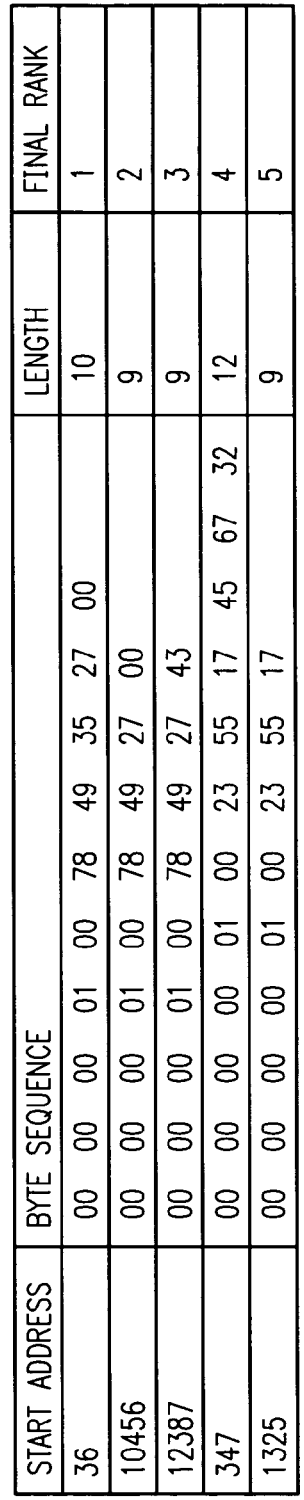
Figure 17:
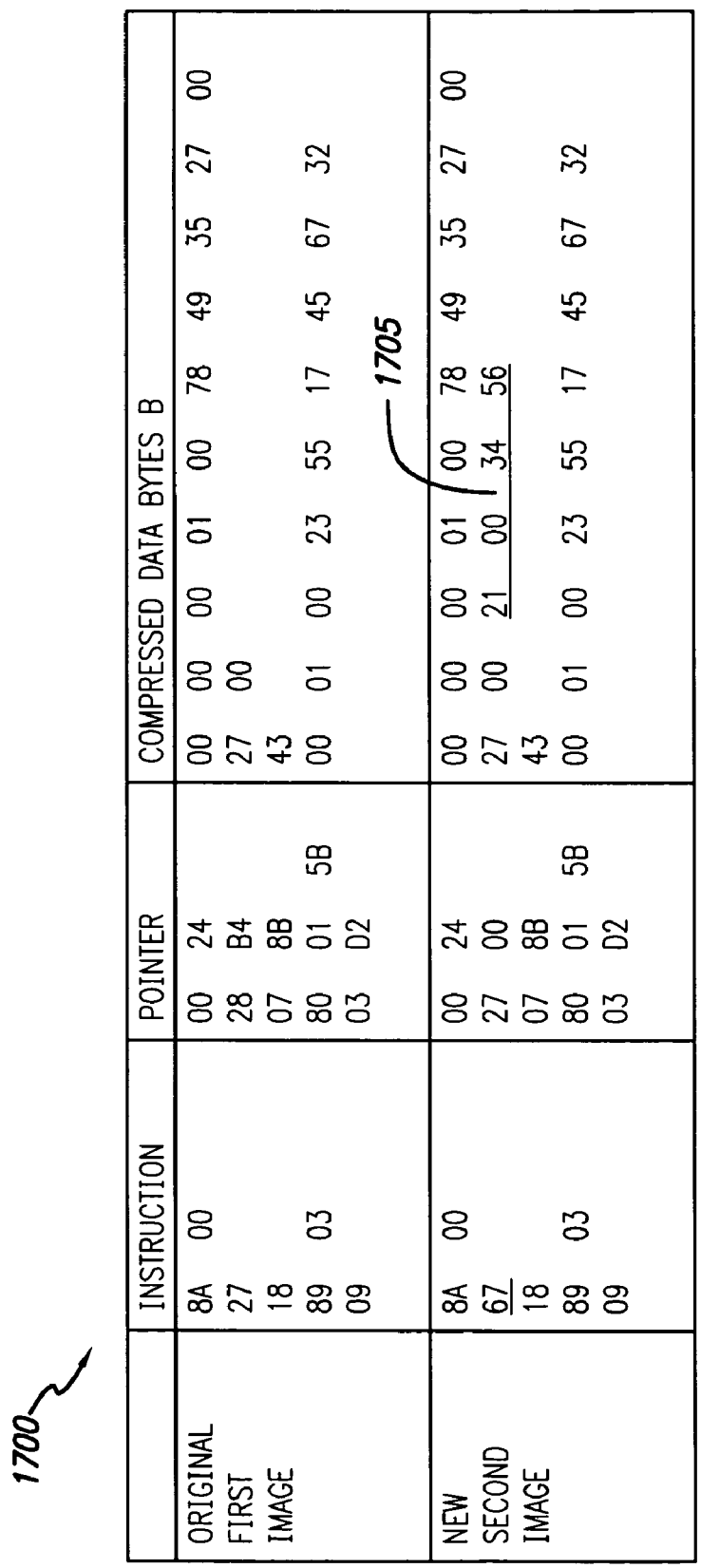

FIG. 1 is a schematic illustration of an updating system of the present invention.
FIG. 2. is an illustration of the relationship between a sequence list and it's associated sector descriptor lists.
FIG. 3 illustrates calculating the section scores.
FIG. 4 illustrates sorting into lexical order.
FIG. 5 illustrates ranking within sets.
FIG. 6 illustrates reducing sets.
FIG. 7 illustrates identifying the next set of maximum matching byte lengths.
FIG. 8 illustrates looping to find the next set of maximum matching byte lengths.
FIG. 9 illustrates expanding sets.
FIG. 10 illustrates reordering according to final rank value.
FIG. 11 illustrates the final rank data.
FIG. 12 illustrates the resulting hex instructions and pointers.
FIG. 13 illustrates applying run length encoding.
FIG. 14 illustrates modifying the instruction scheme.
FIG. 15 illustrates a typical change where a small number of instructions are inserted.
FIG. 16 illustrates the resulting change due to inserting instructions.
FIG. 17 illustrates the compressed data.

DETAILED DESCRIPTION OF THE INVENTION

Reference will now be made in detail to the preferred embodiments of the invention, examples of which are illustrated in the accompanying drawings and tables. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

The present invention will be now be described in relation to a general updating system as illustrated in FIG. 1, showing an update server and client device involved in the updating of a compressed original or first image residing on the client device. Generally, the present invention introduces a new binary compression algorithm which when the changes between the original first image and the new second image are relatively small, will preserve the similarity between the compressed versions of each of these images. The compression algorithm introduces a new data processing path inserted prior to the binary differencing engine (BDE) 118 and the update encoder 116 within the update generator 112. Additionally, the update decoder 154 within the update agent 156 of the existing art is modified to process the instruction stream and address pointers. The update generator and update agent are thus modified to support compression of binary data while preserving similarity in the compressed forms of these images when there is similarity in the new second image and the original first image. This use and support of the compressed binary images enables a small delta to be generated directly between the compressed forms of the images, which can then be transmitted and applied directly to the compressed original first image in the client device to create the new second compressed image.

FIG. 1 shows an update system 100 in accordance with an illustrative embodiment of the invention. The update system 100 includes an update server 110 connected to a client device 150 through a communications network 140. Though shown singularly, client device 150 is representative of any number of devices that may comprise a homogeneous or heterogeneous population of client devices capable of being updated by update system 100. Each such client device 150 contains a current compressed original data image 130 constituting the software or operating code to be updated, which compressed original data image 130 is stored in non-volatile memory (not shown) of client device 150. Client device 150 also contains an update agent 156 that is comprised of download agent 152 for communicating with update server 110 and receiving update package 124 though communications network 140. Update agent 156 is further comprised of update decoder 154 that interprets and applies the update instruction set of update package 124 in order to convert compressed original data image 130 into a compressed new data image 132. Though shown schematically as two separate elements, download agent 152 and update decoder 154 may be parts of the same application or software, be embedded firmware or specialized hardware such as an application specific integrated circuit (ASIC), or may be a sub-component of an application or system software component with additional functionality such as the synchronization and transmission of control parameters or user data between the client device and a control server, which variations and possibilities for implementing the functionalities of download agent 152 and update decoder 154 will be obvious to one skilled in the art.

The update server 110 contains, generally, an update generator 112 and update manager 114. While depicted as a single element, update server 110 may alternatively be comprised of a server array or set of distributed computing devices that fulfill the purposes of update server 110. Update generator 112 creates update packages 124 through the use of a binary differencing engine (BDE) 118 and update encoder 116. Update generator 112 maintains, or receives from an external source, a compressed original data image 130 corresponding to the subject client device 150 and is also supplied with or obtains a copy of the compressed new data image 132 for the subject client device. A copy of the original data image 120 and a copy of the new data image 122 to be applied are submitted to the compression engine (CE) 135. The CE compresses each of these images separately, using the same method (i.e. algorithm), and outputs a compressed original first image 130 and a compressed new second image 132. The BDE 118 receives a copy of the compressed original data image 130 and a copy of the compressed new data image 132 to be applied and, through a process of comparisons, generates lists or sets of COPY and ADD operations, which are potential candidate operations usable in generating the update package 124. Update encoder 116 communicates with BDE 118 to combine additional encoding information to select instructions from the BDE and incorporate other operations derived from additional information to ultimately create the update package 124. In the preferred embodiment, the update encoder 116 is highly integrated with the functionality of the BDE 118 so as to enhance optimization and speed of selecting and encoding instructions sets. Update generator 112, consistent with the invention herein disclosed, generates the update package 124, which at the appropriate time or interval is supplied to the client device 150 via the update manager 114 through communications network 140.

The present invention runs a compression engine 135. The compression engine 135 compresses both original first image and the new second image using a compression algorithm which when the changes between the new second image 122 and the original first image 120 are relatively small, preserves the similarities between the compressed versions of these images. Preserving the similarities between these two images enables a small delta to be generated directly between the compressed versions of these images that can be transmitted and applied directly to the compressed original first image 130 in the client device to create the compressed new second image 132. Since both images need to be analyzed and compressed separately using the same method and algorithm, only the processing for the original first image will be described. The processing for the new second image is identical and can be processed at the same time.

Moving on, the compression engine 135 processes the original first image by:

1. Creating a hash table using the 32 bit "Fowler/Noll/Vo" (FNV-1) hashing algorithm, although an equivalent technique may be used
2. Use the hash table to locate "cutting points" within the original first image such that each section consists of a section of data that is repeated elsewhere in the file, followed by a section of data that is unique
3. Store the starting address of the sections in a data structure suitable for sorting (e.g. a binary tree)
4. Sort the sections into lexical order
5. Refine the sort of the sections to maximize the situations where there is an ascending sequence of start address
6. Encode and output the data as three parallel streams.

FIG. 2 shows a data structure 200 for relating the sequence list 205 and the section descriptor list 215 in accordance with an illustrative embodiment of the invention. First, a list of all unique 4-byte sequences 250 present in the original first image 120 is generated, and stored in an appropriate data structure such that a number representing a score 230, and a reference 235 to a list of section descriptors 215 can be associated with each sequence. Each section descriptor minimally contains the start address 240 of the section relative to the start of the original first image 120, and the number of bytes that match 245 (i.e. match count) between the section starting at this address, and the section in the list with the longest matching byte sequence. An implied "end of match" address can be determined by adding the match count 245 to the start address 240 found in the section descriptor list. Efficient generation of this data from the original first image can be achieved using the Fowler/Noll/Vo FNV-1 or similar hashing algorithm; the depiction of which within the compression engine is not essential to the understanding of the present invention by one skilled in the art.

Next, each sequence list element 250 that references a section descriptor list 215 that contains only one start address is discarded. Additionally, the associated section descriptor list referenced by this section list element is discarded. These references and associated section descriptor lists are removed since they indicate that these sequences are not duplicated in the original first image. By way of explanation and without limitation, the terms "sequence list" and "section descriptor lists" are nominal terms used by the inventor hereof, and the functional steps and effect of the present invention may be implemented using any number of other terms or operation naming conventions.

At this stage in the processing, the compression engine 135 can calculate a score 230 for each remaining sequence list element 250 in the sequence list 205. The calculated score represents the number of bytes from the compressed data bytes expected to be eliminated if the sections associated with this list are included in the final encoding. The score 230 associated with each sequence list element 250 is determined by examining all the entries in the section descriptor list 215 associated with the particular sequence list element 250.

FIG. 3 shows sample data 300 in accordance with an illustrative embodiment of the invention. Considering the data shown for purposes of example in FIG. 3, the score for the first sequence list element at 210 is determined by comparing the byte sequence data shown in FIG. 3 starting at each of the start addresses found in the associated section descriptor list 215, with the byte sequence data starting at each of the subsequent Start addresses. The length of the longest matching data sequence at 310 found is added to the score. No comparison is made for the last start address, since it has no subsequent start address. In this example there being only two start addresses, only one value is added which is 9. From this score the estimated overhead of encoding the sections is subtracted, in this example 3, multiplied by the number of sequences found in the group, in this example 2. Thus, the score for the first group is 9 (longest number of matching bytes) minus 3 (encoding overhead) times 2 (total number of sequences in this section descriptor list), resulting in a score for the first sequence list of 3. This score represents an approximate count of how many bytes the compressed data will be reduced by using the encoding method for all the sections in the section descriptor list 215, relative to the size of the original data at 310 and at 311.

The score for the second sequence list element is determined identically, in this example 8, due to the comparison between byte sequence at 312 and at 313, plus 7 due to the comparison between at 313 and at 314. Again subtracting from this sum the overhead, in this example 3, multiplied by the number of sequences found in the group, in this example 3. Thus, the score for the second sequence list element at 211 is 8 (matching byte count associated with the first start address at 220) plus 7 (matching byte count associated with the second start address at 221) minus 3 (encoding overhead) times 3 (total number of sequences in this section descriptor list), resulting in a score for the second sequence list element at 211 of 6.

The overhead represents the cost of encoding a section, which is comprised of the instruction and the pointer. The scoring process and the bytes, underlined, that do not need to be included twice in the compressed data bytes of the present invention are shown in FIG. 3.

Typically, the cost of encoding a section, or overhead, is between 3 and 5 bytes, and usually biased towards the lower end, being 3 bytes.

If the score associated with a sequence list element is zero or negative, or the section descriptor list associated with a sequence list element contains only a single section, that sequence list element is deleted from the sequence list. Additionally, when a sequence list element is deleted all section descriptor lists 215 associated with the deleted sequence list element are deleted. The effect is to remove sections, affording the count of new data to be copied from the data stream to be extended for the preceding sections.

Prior to processing the final discard section step, it is necessary to ensure that if there is no section with a start address of zero that a sequence element and section descriptor list contains a single section starting at zero. Additionally, this single section starting at zero must have a match length which will make the section run to the start of the lowest address of all existing section is added. This special section will not be discarded.

The above described processing removes many sections and sequences but it is likely that there will be overlap between the sections based on the assumption that it is always desirable to use at least the matching part of each section. Two methods may be used to affect removal of the overlapping between sections and ensure that duplicated data is not included.

The preferred method begins by first sorting the sequence list elements in order of descending score, and processes them in that order. During the processing a copy of the image will be successively reconstructed into a byte array of the same size as the original image, this being designated a coverage map. The bytes in the coverage map are initialized to the most frequently occurring byte value in the original image. The byte sequence of each section referenced by the sequence is checked against the matching addresses in coverage map to see if the byte sequence is identical. The number of bytes not matching is counted, as these represent the amount by which the coverage would be improved if the section is retained in the final encoding. Any section that does not increase the coverage by a minimum of 3 (equivalent to the section encoding overhead already described) is deleted from the section descriptor list. The score for each sequence is can now be refined, and is replaced by the sum of the increased coverage of all associated sections which were retained and not discarded, minus 3 times the number of retained sections (representing the overhead) If the rescored value is negative, the entire sequence list element and associated remaining section list are discarded. If the rescored value is zero or greater (i.e. positive value) the sequence and associated referenced sections are retained and the coverage map is updated with the increased coverage provided by each of these retained sections.

The entire sequence list may be processed as described, in descending score order, however the whole range of the original first image may become covered prior to completing the processing of the sequence list. Thus, it may be more efficient to check periodically during the processing of the sequence list to determine whether the whole range of the original first image has been completely covered. After completing the processing associated with all of the discards described in the preferred method above, the remaining start addresses in each section descriptor list are defined and marked as the "cutting points" to make the final division of the data into sections for sorting and dictionary processing. By way of explanation and without limitation, the term "cutting points" is a nominal term used by the inventor hereof, and the functional steps and effect of the present invention may be implemented using any number of other terms or operation naming conventions.

An alternative embodiment of the present invention that may be used to affect removal of the overlapping between sections and ensure that duplicated data is not included begins by first merging and sorting data from all section descriptor lists according to ascending start address. The compiled results are then examined to determine those sections S1 for which another section S2 exists which both starts at the same or lower address than S1, and where the end of match address S2 is equal or greater to the end of match address S1. In the case where both conditions are met, the section descriptor list for S1 sections are discarded from the compiled results. This merging and sorting process may result in some section descriptor lists containing either zero or one start address descriptors. In these cases the sector descriptor list and associated sequence list elements are deleted.

Next, this list is processed according to ascending start address where any sections $S_1$ to $S_N$ that starts before the end of match address $S_0$, or within 3 bytes of it, are discarded. After discarding each section as described above, the score needs to be recalculated for the referencing sequence found after the discard. If the rescored value is negative, the entire sequence list element and associated remaining section list is discarded. If the rescored value is zero or a greater (i.e. positive value) the sequence list element and associated referencing sections are retained. After completing the processing associated with all of the discards described in the second method above, the remaining start address in each section descriptor list are defined and marked as the "cutting points" to make the final division of the data into sections for sorting and dictionary processing.

Next, regardless of which embodiment was used to effect removal of the overlapping between sections the starting address of the sections is stored in a data structure suitable for sorting. The sections are then sorted in lexical order. FIG. 4 shows an example of the first part of a set of data after sorting 400 in accordance with the present invention. FIG. 4 represents only a small subset of the data that would be obtained when processing the contents of an entire image, and does not attempt to represent a contiguous section of the uncompressed data. The uncompressed data is now prepared for the encoding step.

An alternate embodiment of the present invention refines the sort of the sections to maximize the situations where there is an ascending sequence of start addresses prior to encoding. One method to maximize the ascending sequence of start addresses consists of the following five steps:

1. Find the set of sections, or previously identified sets of sections, with the maximum length of bytes that matches and
2. Sort this set in ascending value of the start address
3. Represent this set of sections as a single section having the start address equal to the lowest start address of the set and ignore the other members of the set
4. Repeat the processing from step 1, of successively shorter matches, until all the sections have been grouped in sets, or only non-matching sections remain
5. Expand the sets of sections and set back to the original sections, starting with the last set, and recursively expand the sets ranking sections from later sets first during the expansion.

Referring now to FIGS. 5 through 14, a method for maximizing the ascending sequence of start addresses in accordance with the present invention is illustrated. The first step, using the sample data shown in FIG. 4, is to examine each byte sequence that contains the same first 4-bytes and compare it with the next byte sequence to determine the maximum length of bytes in these sequences that match. Each byte sequence is grouped in a set of two or more sequences that represents the longest matching length of bytes found. The second step sorts within each set, the byte sequences, and each byte sequence is ranked in accordance with ascending value of starting address. The method of grouping into sets and ranking within the sets 500 is illustrated in FIG. 5 in accordance with the present invention. In this example the maximum matching byte lengths are underlined at 515 and shown grouped into the first set A at 505. Additionally since start address 347 comes before start address 1325, in this example, the byte sequence with start address 347 is ranked at 510 higher than 1325.

The method of reducing sets 600 to contain only the member that has the lowest starting address is illustrated in FIG. 6 in accordance with the present invention. In addition, FIG. 6 shows the next set of maximum matching byte lengths as underlined at 605 and grouped into the second set B at 610.

The third step, in order to support further sorting, is to examine each set of sections and represent them as a single section where the retained or representing section has the lowest starting address, thereby the highest ranking, within the set. The other set members are ignored at this time. In this example, the byte sequence associated with start address 1325 has been removed at 615 since the byte sequence associated with 347 within the set A has a higher rank within the set and will now be used to represent set A.

The fourth step is to repeat the processing described in the first step on the byte sequences remaining from completing the processing for step 2. Both the method of grouping byte sequences into sets and the method of ranking the byte sequences within each set are employed for successively shorter matches, until all the sections have been grouped in sets, or only non-matching sections remain.

The method of finding the next set of sections with the maximum length that matches 700 for the remaining byte sequences is illustrated in FIG. 7 in accordance with the present invention. In this example, the byte sequence associated with start address 12387 has been removed at 705 since the byte sequence associated with 10456 within the set B has a higher rank within the set and will now be used to represent set B. In addition, FIG. 7 shows the next set of maximum matching byte lengths as underlined at 710 and grouped into the third set C.

The fourth step continues processing the data until all sections have been grouped in sets, or only non-matching sections remain. This method of looping 800 or continuing processing is illustrated in FIG. 8 in accordance with the present invention. In this example, the byte sequence associated with start address 10456 has been removed at 805 since the byte sequence associated with start address 36 within the set C has a higher rank within the set and will now be used to represent set C. In addition, FIG. 8 shows the next set of maximum matching byte lengths as underlined at 810 and grouped into the fourth set D.

The final step is to expand the set of sections and sets back to the original sections, starting with the last set, and recursively expanding the sets ranking sections from later sets first during the expansion. The method of expanding sets 900 of sections back to their original sections is illustrated in FIG. 9 in accordance with the present invention. In this example, the last set of maximum length matching byte sections is D. Since multiple sets of sections have not been used in the example, the step of expanding multiple sets of sections is not illustrated but will be obvious to one skilled in the art. The final step begins with the byte sequence associated with start address 36, being the only member of the last set D and thus having the highest rank in set D. This byte sequence is assigned a final rank value of 1 at 905. Additionally, the byte sequence associated with start address 36 is also found in set C with a rank within the set C of 1, so even if it were not a member of set D, it is assigned a final rank of 1. This is because set C has two members, and the byte sequence associated with start address 10456 has a lower rank within set C. Moving on, the next byte sequence to be ranked using this method is the sequence associated with start address 10456 since it is found in set C. Accordingly, since there are no remaining members to be processed from set C, so this byte sequence is assigned a final rank of 2 at 910. Since no members remain in set C, set B is now examined. Set B has two members with start address 12387 and 10456 respectively. Since the byte sequence associated with 10456 has already been assigned a final rank of 2 and because within set B it was ranked within the set higher than the byte sequence associated with 12387, the byte sequence associated with 12387 is assigned a final rank 3 at 915. The last set processed using this method is set A, which has two members with start addresses of 347 and 1325 respectively. The byte sequence associated with start address 347 was ranked within set A above the sequence with start address 1325 it is assigned a final rank of 4 at 920. Lastly, the byte sequence associated with start address 1325 is assigned a final rank of 5 at 925.

The results are then reordered according to the assigned final rank value 1000 and this result is shown in FIG. 10 in accordance with the present invention.

The original first image and the new second image have now been processed in accordance to the method described above and are ready to be encoded.

The compression engine 135 employs an encoding process that generates three parallel data streams for each image. The encoding process outputs:

1. A stream of compressed data bytes (B)
2. An instruction stream containing the count of data (C) to copy from the previously decoded section and containing the associated count of new data (N) to be copied from the data stream
3. A stream of relative or absolute address pointers (A) indicating the address within the original data at which a section was found and to which it must be copied when decompressing.

Using this method, the final rank data 1100 shown in FIG. 10 can be represented as shown in FIG. 11 in accordance with the present invention. The compressed data byte stream B at 1105 consists of the original data with all bytes that are common to the previous section omitted. The decoder, or de-compressor, keeps a copy of the previous section in memory, and copies the first C bytes at 1110 as the beginning of the current section, followed by N bytes at 1115 copied from B. The first section is treated as a special case and all of its data appears in B, as there is no previous section data available. In this example, starting with the byte sequence associated with start address 36, since it was assigned a final rank of 1, the count of data to copy C from the previously decoded section is 0. The new data to be copied N is the entire compressed data byte sequence B associated with start address 36 and thus is 10. The address pointer associated with this byte sequence is 36. Moving on, the next highest final rank byte sequence is associated with start address 10456, so the address pointer associated with this byte sequence is 10456. To reconstruct the entire byte sequence for this address pointer, the first 7 bytes of the previously decoded section are copied, since they are identical to those found in the byte sequence associated with start address 36. Next, 2 bytes of new data are copied from compressed data bytes B, so the count N has the value of 2. Next, according to final rank is the byte sequence associated with start address 12387, so the address pointer associated with this byte sequence is 12387. To reconstruct the entire byte sequence for this address pointer, the first 8 bytes of the previously decoded section are copied, since they are identical to those found in the byte sequence associated with start address 10456. Next, 1 byte of new data is copied from compressed data bytes B, so the count N has the value of 1. Continuing in this manner, the next address pointer, according to final rank, is 347. To reconstruct the entire byte sequence for this address pointer, the first 3 bytes of the previously decoded section are copied, since they are identical to those found in the byte sequence associated with start address 12387. Next, 9 bytes of new data is copied from compressed data bytes B, so the count N has the value of 9. Finally, the remaining, or lowest final rank, byte sequence can be processed. This sequence has an associated start address of 1325, and the address pointer A is set to 1325. To reconstruct the entire byte sequence for this address pointer, the first 9 bytes of the previously decoded section are copied, since they are identical to those found in the byte sequence associated with start address 347. No new data is required to be copied from compressed data bytes B, since the first 9 bytes within the sequence for address pointer 347 are identical to the entire 9 bytes associated with address pointer 1325. Thus, the count N has a value of 0.

In the above example, the data bytes have been reduced from 49 to 22, but 5 instructions with associated address pointers need to be encoded. The preferred embodiment of the present invention efficiently encodes C, N and A. This instruction encoding method depends on the values of C and N, and the difference between the last address pointer and the current address pointer.

To wit, the preferred embodiment of the encoding method has four required operations. These operations include:

1. If C<=15 and N<=7 a single byte instruction is used, where bit 7 is always 0, bits 6->4 represent the value of N, and bits 3->0 represent the value of C;
2. If either C>=16 or N>=8 a 2 byte instruction is used, where bit 15 is always 1, bits 14->8 represent the value of N, and bits 7->0 represent the value of C;
3. If an address pointer is used which is a 2 byte relative pointer, Bit 15 is always 0, bit 14 is a repeat flag, and bits 13->0 are a 14 bit positive offset from last pointer;
4. If a pointer is used which is a 3 byte absolute pointer, Bit 23 is always 1, bit 22 is a repeat flag, and bits 21->0 is a 22 bit absolute pointer.

When the repeat flag is set, that indicates that this pointer has no instruction associated with it and should be used to make an exact copy of the most recently copied data at another address without processing any further instruction data. In the decoder this may be implemented by reading the A stream first, and only reading the next instruction byte or word if the repeat flag is not set. The repeat flag allows a smaller encoding for situations where a section is repeated exactly in multiple places in the original first image. Because the use of a particular string is sorted by address, often a relative offset is sufficient. A relative pointer may be used for the first section, and is assumed to be relative to address zero. The resulting instructions and pointers 1200 from applying this method to the example data above are shown in FIG. 12 in accordance with the present invention.

The instructions thus vary in size from a minimum of 3 to a maximum of 5 bytes, normally weighted towards the lower end. In the example everything except the special case initial section, and one other section encodes as a total of 3 bytes for instruction plus pointer because relative addresses can be used and C is less than 16 and N is less than 8. The total overhead for instructions plus pointers is 18 bytes, giving an overall compressed size of 18+22=40 bytes.

The compression process is complex, but the decoding process is very simple. It consists simply of reading the instruction stream and pointer, and copying the determined number of bytes from the previous section, and from the compressed data to the required destination address.

In an alternative embodiment of the present invention, allows smaller relative pointers to be used in a small number of additional cases. In this embodiment, the meaning of the relative pointer is changed to be the offset relative to the end of the previous section, rather than the offset relative to the beginning of the previous section.

In another alternative embodiment of the present invention, the instruction byte 00 which would never otherwise be generated is inserted in the instruction stream to indicate that the next two bytes in B represent a run length, and a byte value to be repeated for the length of the run. This allows long sequences (up to 255) of the same value within B to be replaced by only 2 bytes. The result from applying this run length encoding method 1300 to the compressed data bytes B using the previous sample data is shown in FIG. 13 in accordance with the present invention. Thus, for address pointer 36 the first compressed data byte at 1305 is 03 relating a run length of 3, and the second compressed data byte at 1305 is 00 relating the byte value to be repeated for the length of run.

The modification to the instruction scheme 1400 is shown in FIG. 14. In this instance the effect is neutral, with one byte added, and one removed, indicating it is not worthwhile for runs of 3 or less, however it can be seen that for runs of 4 or more identical bytes, a saving will be achieved.

Each of these encoding methods are limited to 22 bit addresses, so the largest block of data that can be compressed is 4 Megabytes. If larger data should be compressed it can be segmented into smaller sections, or an alternative encoding scheme could be employed.

In yet another alternative embodiment the instruction byte 00 at 1405 is used to indicate that the next byte contains an encoded repeat interval, and repeat count, and that the subsequent byte or bytes contain the data to be repeated. A number of schemes for encoding the repeat interval and count might be devised. One example would be that the values of bits 5 and 6 of the byte following the 00 instruction byte represent a two bit binary number holding a repeat interval in the range 1 to 4, by using the value 0 to represent an interval of 4, and that bits 4 through 0 represent a 5 bit binary number holding a repeat count in the range 1 to 32, using the value 0 to represent 32.

In yet another alternative embodiment, the most significant bit, bit 7 of the byte following the 00 instruction byte is set to 0 to indicate the remainder of the byte contains the encoded repeat interval and repeat count. When bit 7 of the byte following the 00 instruction byte is set to 1 this indicates that the following 7 bits select one of 128 special byte sequences that are stored in a file header. When one of these special sequence codes is found during decoding, the bytes from the sequence are inserted into B, allowing short but frequently used sequences from within B to be substituted by a smaller form during the encoding process. The special byte sequences could be of fixed length, or stored with a length associated with them in the header of the file.

In yet another alternative embodiment the address pointers A could be encoded in an alternative fashion. This encoding uses variable length address pointers, which may be any length from 2 to 9 four-bit nibbles. The most significant bit, that is bit 3 of the first four-bit nibble of each address pointer indicates that there is no length associated with this pointer, and that the length of the previous pointer should be assumed as the length of the current one. The next most significant bit, bit 2, acts as the repeat flag as previously described in the preferred embodiment. The remaining 2 bits are used as a 2 bit binary number indicating the count of the additional nibbles which form part of this address pointer. A value of 0 represents 2 further nibbles, a value of 1, 3 further nibbles, a value of 2, 5 further nibbles, and a value of 4, 7 further nibbles. The most significant bit of the second nibble in address pointers of any of these lengths represents the sign of the relative address, 0 representing a positive number, and therefore a higher address relative to the last one, and 1 representing a negative number, and therefore a smaller address relative to the previous one. Using this scheme all addresses can be relative, and the maximum address which can be represented is plus $2^{027}$ −1 or minus $2^{027}$, that is 128 megabytes. This is larger than the addressable memory of current embedded devices. Thus this alternative embodiment has the advantage of both reducing the average size of address pointers, and removing the limit of processing data in blocks of 4 megabytes, at the cost of additional complexity in the encoder and corresponding decoder.

The objective was to create a compression scheme that maintained maximal similarity between compressed forms of data when small changes are made to the uncompressed form.

A typical change to create the new second image from the original first image would be when making bug fixes to software. Often a small number of instructions are inserted into the middle of the code. The original sample data, previously shown as FIG. 4, has been altered by such an insertion of the sequence 21 00 34 56 underlined at 1505 is shown in FIG. 15 as a typical change 1500 in accordance with the present invention.

This result's in the following change at 1605 to the compression process 1600 is shown in FIG. 16 in accordance with the preferred embodiment of the present invention. The compressed data 1700 can be compared as follows, difference underlined at 1705, is shown in FIG. 17 in accordance with the present invention.

Inserting 4 bytes in the original first image to form the new second image has resulted in a single byte changing, and 4 bytes inserted in the compressed new second image relative to the compressed original first image.

Other changes to the original first image may have a bigger impact, if for example they result in different cutting points being selected, but the impact of a small change in the original first image to create the new second image should always have only a localized effect on the compressed new second image relative to the compressed original first image.

If data is inserted in the original first image to create the new second image, this will often have the effect of generating a predictable change in the absolute pointers, such that all absolute pointers referencing an address within a particular range will be increased by a constant amount in the compressed new second image relative to the compressed original first image. By adding some special sequence of bytes, otherwise unlikely to occur in the data being encoded at the beginning of the pointer data, a Binary Difference Engine can find the pointer data, detect this relocation, and encode the change to the pointer table as a special operation, in which the existing data in the original first image can be modified, rather than new data being encoded and included in the difference package. The expression of the relevant relocation table and instructions will typically be much smaller than adding the modified data to the difference package.

The compression process is complex, but the decoding process is very simple. It consists simply of reading the instruction stream and pointer, and copying the determined number of bytes from the previous section, and from the compressed data to the required destination address.

The foregoing descriptions of specific embodiments of the present invention have been presented for the purposes of illustration and description. They are not intended to be exhaustive or to limit the invention to the precise forms disclosed, and should be understood that many modifications and variations are possible in light of the above teaching. The embodiments were chosen and described in order to best explain the principle of the invention and its practical application, to thereby enable others skilled in the art to best utilize the invention and various embodiments with various modifications as are suited to the particular use contemplated. The present invention has been described in a general software update environment. However, the present invention has applications to other software environments requiring lossless data compression. Therefore, it is intended that the scope of the invention be defined by the claims appended hereto and their equivalents.

What is claimed is:

1. A method for providing an updated new image in a client device based on an original image and a new image, comprising:

compressing said original image to form a compressed original image and separately compressing the new image to form a compressed new image, each compression using a compression algorithm;

generating a reduced size update package representing a delta between said compressed original image and said compressed new image, wherein said delta identifies differences between the two compressed images; and decoding and applying said reduced size update package directly to the compressed form of the original image to create a compressed form of the new image in said client device;

wherein said compression algorithm preserves similarities between the original image and the new image within said compressed original image and said compressed new image when the changes between the uncompressed images are relatively small.

2. The method of claim 1, wherein the compression algorithm further comprises:

finding cutting points establishing sections within said original image and said new image, wherein the cutting points divide material in the original image from material in the new image;

sorting sections created by dividing the original image and the new image at the cutting points into new sections and repeated sections, wherein repeated sections are identical sections within the new image and the original image, and encoding each new section;

establishing at least one address pointer associated with at least one encoded new section;

computing the reduced size update package comprising at least the at least one address pointer and at least one new section; and building the updated new image from the reduced size update package as applied to an existing compressed original image based on the at least one address pointer and at least one encoded new section;

wherein cutting points are located within the original image such that each section consists of a section of data that is repeated elsewhere in the file, followed by a section of data that is unique.

3. The method of claim 2, wherein said sorting of sections further comprises using lexical order as the sections sort.

4. The method of claim 2, finding cutting points further comprises:

a. Storing a sequence element for sequences present in the original image in a first sequence list data structure and storing sequences present in the new image in a second sequence list data structure whereby a number representing a score and a reference to a section descriptor list can be associated with the sequence element;

b. Calculating the score for each sequence element within the first and second sequence lists generated for the original image and new image, respectively;

c. Creating the section descriptor lists for each reference found within the first and second sequence list data structures;

d. Mapping each sequence list element to the section descriptor list using said reference;

e. Populating the section descriptor lists created for the first sequence list with a start address of the section relative to the start of the original image and a match count relating the number of bytes that match between that section starting at this address and the section in the list with a longest matching byte sequence;

f. Populating section descriptor lists created for the second sequence list with a start address of the section relative to the start of the new image and a match count relating the number of bytes that match between that section starting at this address and the section in the list with a longest matching byte sequence;

g. Removing sections and associated sequences to extend new data to be copied from the preceding sections;

h. Removing an overlapping between sections, wherein said overlapping represents remaining duplicated data not to be included; and i. Marking the remaining start address in each section descriptor list as the cutting points to make the final division of data into the sections for sorting and dictionary processing.

5. The method of claim 2, wherein refining the sort of the sections further comprises:

a. Finding sections with a maximum length of bytes that matches and sorting this set in ascending value of start address;

b. Representing this set of sections as a single section having a start address equal to a lowest start address of the set and ignoring other members of the set;

c. Repeating the above processing until all the sections have been grouped in sets; and d. Expanding the sets of sections and set back to the original sections, starting with the last set, and recursively expand the sets ranking sections from later sets first during the expansion.

6. The method of claim 2, further comprising:

a. Outputting three parallel data streams to include (i) compressed data bytes (ii) instructions containing a count of data to copy from a previously decoded section and containing an associated count of new data to be copied and (iii) relative or absolute address pointers indicating the address within the original data at which a section was found and to which it must be copied when decompressing;

b. Encoding the count of data to copy, the new data to copy, and the relative or absolute pointers.

7. The method of claim 1, wherein said reduced update package decoding and applying further comprises:

a. Reading an instruction stream and a pointer stream; and b. Copying a determined number of bytes from a previous section, and from compressed data to a required destination address.

8. The method of claim 4, wherein said calculating score represents an approximate count of how many bytes the compressed data will be reduced for all of the sections in a section descriptor list relative to the size of original data.

9. The method of claim 4, wherein said removing sections further comprises:

a. Deleting the sequence list elements from sequence lists for zero or negative scores;

b. Deleting sequence list elements from each sequence list for associated section descriptor lists containing only a single section; and c. Deleting all section descriptors associated with deleted sequence list elements.

10. The method of claim 4, wherein said removing overlapping further comprises:

a. Sorting sequence list elements generated for the original image in order of descending score ready for processing in that order;

b. Reconstructing a copy of the original image into a byte array of the same size as the original image as a coverage map;

c. Initializing bytes in the coverage map using a most frequently occurring byte value in the original image;

d. Checking byte sequence of each section referenced by the section against the matching address in the coverage map determining if byte sequences are identical;

e. Counting a number of non-matching bytes;

f. Deleting sections that do not increase the coverage by a minimum of the a section encoding overhead;

g. Replacing a score for each sequence with the sum of increased coverage of all retained sections minus overhead;

h. Deleting items for negative rescored values;

i. Retaining items zero or greater rescored values; and j. Updating the coverage map with the increased coverage provided by each of the retained sections.

11. The method of claim 4, wherein said removing overlapping further comprises:

a. Merging and sorting data from all section descriptor lists according to ascending start address;

b. Determining sections S1 for which another section S2 exists which both start at a same or lower starting address of S1 and where an end of match address S2 is equal to or greater to an end of match address S1;

c. Discarding the section descriptor list for S1 sections where both section S2 exists which starts at a same or lower starting address of S1 and where an end of match address S2 is equal to or greater to an end of match address S1;

d. Deleting the sector descriptor list and associated sequence list elements for any sector descriptor lists containing either zero or one start address;

e. Discarding any sections S1 to SN that start within a predetermined amount of a beginning or an end of match address S0;

f. Recalculating score for the referenced sequence found after the discarded sections;

g. Deleting sequence list elements and associated section list for negative rescored values; and h. Retaining sequence lists elements and associated referencing sections for recalculated scores zero or greater.

12. The method of claim 6, wherein said instruction stream is further compressed by applying a run length encoding which comprises inserting an instruction byte to indicate a next two bytes in a compressed data byte stream.

13. The method of 6, wherein said instruction stream is further compressed by applying a run length encoding which comprises inserting an instruction byte to indicate that the next byte contains an encoded repeat interval and repeat count.

14. The method of claim 6, wherein said instruction stream is further compressed by applying a run length encoding which comprises inserting an instruction byte whereby the most significant bit is set to zero.

15. The method of claim 6, wherein said address pointers stream is further compressed by using a variable length address pointer encoding.

16. The method of claim 6, wherein said encoding further comprises adding some special sequences of bytes at a beginning of pointer data allowing a binary difference engine to find pointer data, detecting this relocation, and encoding a change to a pointer table as a special operation.

17. The method of claim 10, wherein said reconstructing further comprises a check whether a whole address range of the original image is covered.

18. The method of claim 1, wherein the reduced size update package is established by:
  expressing differences between the compressed original image and the compressed new image as a set of instructions comprising one or more ADD operations and one or more COPY operations; and
  encoding the reduced size update package to include an instruction set comprised of a plurality of ADD and COPY operations.

19. A method for establishing a reduced sized update package usable to update a device, comprising:
  compressing an original image to form a compressed original image and separately compressing the new image to form a compressed new image, each compression using a compression algorithm, wherein said compression algorithm comprises:
    finding cutting points establishing sections within the original image and the new image, wherein cutting points are located within the original image such that each section consists of a section of data that is repeated elsewhere in the file, followed by a section of data that is unique;
    sorting sections established by the cutting points into new sections and repeated sections, wherein repeated sections are identical sections within the new image and the original image;
    establishing at least one address pointer associated with at least one new section; and
    computing the reduced size update package comprising at least one address pointer and at least one new section;
  wherein said compression algorithm preserves the similarities between the original image and the new image within said compressed original image and said compressed new image when the changes between the original image and the new image are relatively small.

20. The method of claim 19, wherein the reduced size update package is established by:
  expressing differences between the compressed original image and the compressed new image as a set of instructions comprising one or more ADD operations and one or more COPY operations; and
  encoding the reduced size update package to include an instruction set comprised of a plurality of ADD and COPY operations.

21. The method of claim 19, wherein the original image is in compressed form, and whereby said reduced update package is decoded and applied to the compressed form of the original image to create a compressed form of the new image.

22. A method for providing an updated new image based on an original image and a new image, comprising:
  computing a reduced size update package by compressing said original image to form a compressed original image and separately compressing said new image to form a compressed new image, each compression using a compression algorithm, said compression algorithm comprising:
    finding cutting points establishing sections within the original image and the new image, wherein the cutting points divide material in the original image from material in the new image; and
    sorting sections created by dividing the original image and the new image at the cutting points into new sections and repeated sections, wherein repeated sections are identical sections within the new image and the original image, and encoding each new section;
  wherein said compression algorithm preserves similarities between the original image and the new image within said compressed original image and said compressed new image when the changes between the uncompressed images are relatively small.

23. The method of claim 22, wherein the reduced size update package is established by:
  expressing differences between the compressed original image and the compressed new image as a set of instructions comprising one or more ADD operations and one or more COPY operations; and; and
  encoding the reduced size update package to include an instruction set comprised of a plurality of ADD and COPY operations.

24. The method of claim 22, wherein finding cutting points further comprises:
  establishing section descriptor lists with a start address of each section relative to a beginning of the original image;
  establishing section descriptor lists with a start address of each section relative to a beginning of the new image;
  removing sections and associated sequences to extend new data to be copied from preceding sections;
  removing an overlapping between sections, wherein said overlapping represents remaining duplicated data not to be included; and
  marking a remaining start address in each section descriptor list as the cutting points to make a final division of data into sections.

25. The method of claim 22, wherein the original image is in compressed form, and whereby said reduced update package is decoded and applied to the compressed form of the original image to create a compressed form of the new image.

* * * * *